United States Patent
Hinzpeter et al.

(10) Patent No.: US 6,845,710 B2
(45) Date of Patent: Jan. 25, 2005

(54) PROCESS AND APPARATUS FOR COMPRESSING METALLIC POWDER INTO A COMPACT

(75) Inventors: Jürgen Hinzpeter, Schwarzenbek (DE); Ulrich Zeuschner, Schwarzenbek (DE); Ingo Schmidt, Schwarzenbek (DE); Thomas Pannewitz, Schwarzenbek (DE); Udo Baltruschat, Hamburg (DE); Thorsten Ehrich, Hamburg (DE); Ulf Hauschild, Schwarzenbek (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 10/225,600

(22) Filed: Aug. 22, 2002

(65) Prior Publication Data

US 2003/0041748 A1 Mar. 6, 2003

(30) Foreign Application Priority Data

Aug. 31, 2001 (DE) ................................ 101 42 624

(51) Int. Cl.⁷ .............................. B30B 11/02; B22F 3/02
(52) U.S. Cl. ............................... 100/41; 100/42; 419/66
(58) Field of Search ............................ 100/35 E, 214, 100/70 R, 218, 41, 42; 264/69, 109, 299, 328.2, 328.7, 437, 71; 419/1, 28, 38, 41, 48, 37, 66, 8; 425/62, 200, 260, 432, 448, 449, 456, 78, 424, 421, 354, 355

(56) References Cited

U.S. PATENT DOCUMENTS

| | | | | |
|---|---|---|---|---|
| 4,518,335 A | * | 5/1985 | Pujari ............................ | 425/78 |
| 4,583,966 A | * | 4/1986 | Ocker et al. ................. | 493/374 |
| 5,030,075 A | * | 7/1991 | Leinweber ................... | 425/125 |
| 5,253,993 A | * | 10/1993 | Birkenstock et al. ......... | 425/78 |
| 6,106,264 A | * | 8/2000 | Stenekes ...................... | 425/145 |
| 6,325,965 B1 | * | 12/2001 | Makita et al. ................. | 419/38 |

FOREIGN PATENT DOCUMENTS

| | | | | |
|---|---|---|---|---|
| DE | 199 03 417 A1 | | 8/2000 | |
| JP | 63132800 A | * | 6/1988 | ........... B30B/11/00 |
| JP | 04333396 A | * | 11/1992 | ........... B30B/11/00 |
| JP | 05295405 A | * | 11/1993 | ............ B22F/3/02 |
| JP | 08309594 A | * | 11/1996 | ........... B30B/11/00 |
| SU | 804165 | * | 2/1981 | |

OTHER PUBLICATIONS

"Hydraulic Powder Compacting Presses UPP" by Osterwalder AG, Industriering 4, CH3250 Lyss.

"Mikroprozessor gesteuertes hydraulisches Pressen in der Pulvermetallurgie aus Werkstatt und Betrieb" of 1986.

* cited by examiner

*Primary Examiner*—Allen Ostrager
*Assistant Examiner*—Jimmy Nguyen
(74) *Attorney, Agent, or Firm*—Vidas, Arrett & Steinkraus, P.A.

(57) ABSTRACT

A process for compressing metallic powder into a compact in a powder press which has a die-plate, a hydraulically operated upper ram and at least one hydraulically operated lower ram, wherein the lower ram is set to vibrations while the die-plate is being filled with metallic powder.

1 Claim, 1 Drawing Sheet

PROCESS AND APPARATUS FOR COMPRESSING METALLIC POWDER INTO A COMPACT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

It has been known for long to manufacture blanks by sintering from powdered metal. Their manufacture requires a press, an eccentric or hydraulic press, which has a die-plate and at least one lower ram and an upper ram. The lower ram closes the bore of the die-plate from bottom while it is being filled with the appropriate powder. After the so-called precision proportioning during which the upper ram travels upwards to a predetermined position and powder located beyond the die-bore is stripped the upper ram is lowered and the lower ram is moved up and the powder mass is compacted between the rams. While undergoing compaction, the powder particles which have a grain size of about 0.1–500 $\mu$m are "entangled" with each other so that a structure arises which is stable in shape, may be readily removed from the press, and may be subjected to a further processing operation, particularly to sub-sequent sintering.

During sintering, dimensional variations will occur because of shrinkage phenomena. Shrinkage is a material constant, on one hand, but is also dependent on the density of the compact, on the other. The crucial factor in filling, therefore, is that the compact be of a density as uniform as possible across its extension. If this requirement is not met it will possibly be necessary to rework the blank. For instance, if a milling cutter blade is manufactured by such a sintering process and it lacks the desired dimensional accuracy after being sintered it needs regrinding. This, however, increases the expenditure in manufacture and fully or partly cancels the benefit of sintering which involves less expenditure as such.

Particularly problematic are components of a complex shape, e.g. also reversible cutting blades including specific clamping grooves and land-and-groove chip breakers.

The die-plate is usually filled by means of a so-called charging shoe connected to a powder source. The charging shoe moves on the die-plate surface surrounding the die-bore and is filled with powder. The powder falls into the die-bore while the shoe is moving across the bore. The shoe is subsequently shifted back to the initial position. During both the filling stroke and return stroke, a one-sided compaction occurs at the border of the die-bore, i.e. in the regions that are located on the axis along which the charging shoe is shifted.

The company document "Osterwalder Verfahrenstechnologie" of the Osterwalder AG, Industriering 4, CH-3250 Lyss, has made it known to generate different speeds during the filling procedure using the charging shoe while additionally vibrating the die-plate at the same time. This company document has further made it known to carry out a motion of the die-plate, which is precisely defined and in synchronism with the filling axis, while the charging shoe is travelling back.

DE 199 03 417 has also made it known to move the charging shoe, during the filling procedure, beyond the die-bore in at least two further directions different from the first direction. The compaction which comes into being on the associated wall of the die-bore is distributed in an approximately uniform way here across the circumference of the die-bore.

From "Mikroprozessor gesteuertes hydraulisches Pressen in der Pulvermetallurgie aus Werkstatt und Betrieb" of 1986/6, pages 80ff, it has become known to fill in the powder by means of programmable speeds and times, vibrating motions or oscillations during the filling procedure. Then, the compression procedure is effected according to a typical procedural chart.

As was mentioned previously the aim in manufacturing cemented-carbide compacts is to achieve a density as equal as possible for all compacts, particularly in their cutting areas. This aim is achieved only incompletely by the known measures described.

Therefore, it is the object of the invention to provide a process for compressing metallic powder into a compact in a powder press wherein the aim of imparting the same density to all compacts across their extension is achieved even better.

BRIEF SUMMARY OF THE INVENTION

In the inventive process, the lower ram is set to vibrations while the die-plate is being filled with metallic powder. As was set forth previously, the lower ram takes a first position during the filling procedure. Subsequently, after the filling procedure, it is moved to the precise proportioning position so that excessive powder may be removed. Subsequently, the lower ram is lowered to an initial position for the compression procedure. During the positions and motions of the lower ram, which can also contain several ram sub-portions, an oscillation takes place on the lower ram which transfers itself to the powder and causes an equalization of powder distribution in the die-bore so as to achieve approximately complete homogeneity. It is understood that the former process actions such as vibrating the charging shoe and/or the die-plate may be performed in addition to implementing the inventive process.

Alternatively or additionally, the process provides for the upper ram and/or the lower ram to be set to vibrations during the compression procedure, particularly at the initial stage. Once the metallic powder is under a considerable compression power oscillating or vibrating the rams can no longer cause powder particles to be dislocated. Therefore, oscillating the rams is particularly efficient primarily during the initiation of the compression procedure.

The inventive process can be efficiently employed for hydraulic presses, in particular. To this effect, a vibration-generating device which is triggered by the program control of the press is associated with the hydraulic assembly or hydraulic drive. Vibrations can be generated by producing an oscillating vibration in the hydraulic medium applied to the press cylinder, by means of the valve assembly via which the pressure is generated in the hydraulic cylinder. However, it is also imaginable to produce a desired vibration by means of a separate hydraulic vibration generator which is in communication with the cylinder of the hydraulic press. It is possible to adjust the frequency and/or amplitude of vibration and to bring it to optimum values in both the one and other case.

BRIEF DESCRIPTION OF THE SEVERAL VIEWS OF THE DRAWINGS

The invention will be described in more detail below with reference to the drawings.

DETAILED DESCRIPTION OF THE INVENTION

Figure 1:
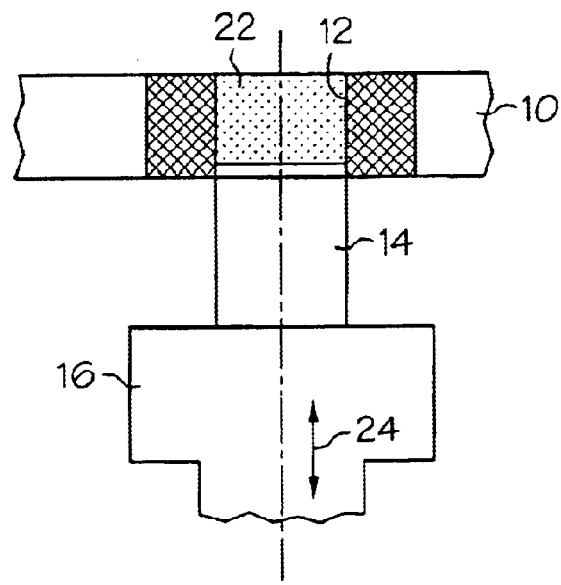
FIG. 1 shows a die-plate and a lower ram in the filling positions in an extremely schematic way.
Figure 2:
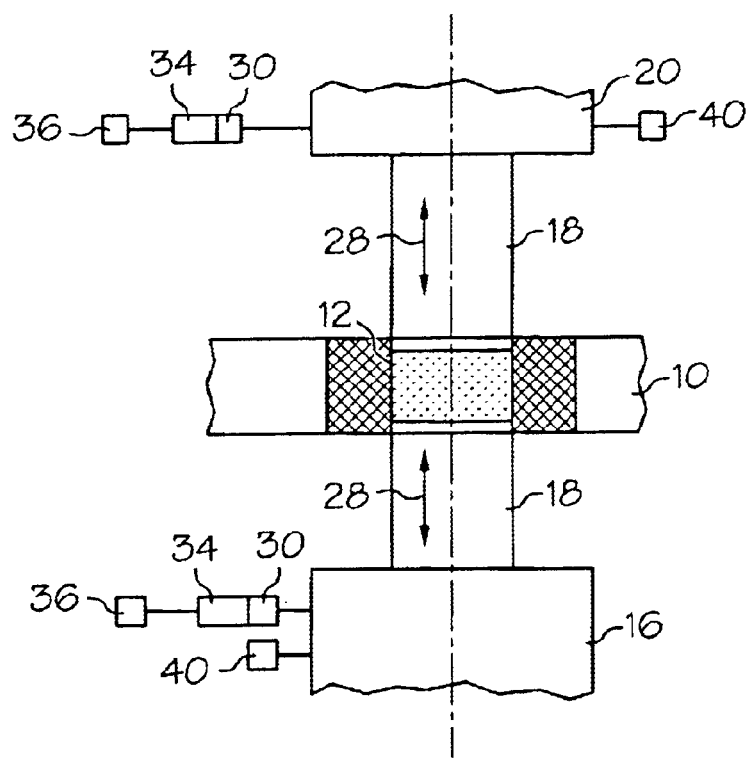
FIG. 2 shows the die-plate of FIG. 1 with an upper ram and lower ram at the beginning of the compression stage.

While this invention may be embodied in many different forms, there are described in detail herein a specific preferred embodiment of the invention. This description is an exemplification of the principles of the invention and is not intended to limit the invention to the particular embodiment illustrated Referring to FIGS. 1 and 2, a die-plate 10 can be seen which has a die-bore 12 for the manufacture of a compact from a metallic powder, e.g. for a cutting blade for milling, drilling or the like. To this end, the bore 12 normally is of a specific contour which is not shown here, however. FIG. 1 merely illustrates the lower ram 14 of a hydraulic press for the manufacture of compacts which is driven by a slide 16 of a lower press cylinder not shown in detail. FIG. 2 also illustrates an upper ram 18 which is driven by a slide 20 of an upper press cylinder not shown in detail.

In the representation of FIG. 1, powdered material 22 was filled into the bore 12 by means of a charging shoe which is not shown, with the lower ram 14 occupying a predetermined filling position. Proper proportioning is performed by causing the lower ram 14 to travel upwards to a predetermined position so that a predetermined volume of powder 12 is in the bore 12. Material projecting beyond the bore 12 is removed in an appropriate way. During the filling and precise proportioning procedure described, the lower ram 14 is set to a vibration of a predetermined amplitude and frequency by means of a vibration generator 30 which may be associated with the hydraulic drive 34. The vibration is outlined by the double arrow 24 in FIG. 1. This action helps homogenize the powdered material 22 in the bore 12. This way also obtains the uniform density aimed at for the material, which then is not to vary any longer during the compression procedure. Because of different geometries, however, a different density may result nevertheless during compression. This is why a vibration is imparted to both the lower ram 14 and upper ram 18 during the compression procedure as shown in FIG. 2, specifically at its initial stage, as is shown by the double arrows 26 and 28, respectively. The amplitude and frequency may also be adjusted here and can be varied depending on the material and geometry of the compact.

The above Examples and disclosure are intended to be illustrative and not exhaustive. These examples and description will suggest many variations and alternatives to one of ordinary skill in this art. All these alternative and variations are intended to be included within the scope of the attached claims. Those familiar with the art may recognize other equivalents to the specific embodiments described herein which equivalents are also intended to be encompassed by the claims attached hereto.

What is claimed is:

1. A process for compressing metallic powder into a compact comprising the steps of:

providing a powder press comprising a die-plate having a die-bore, the die-bore having a bottom surfaced defined by a lower ram which is arranged to move vertically within the die-bore of the die-plate and the powder press further including an upper ram which is positioned above the die-plate and arranged to move vertically within the die-bore of the die-plate;

moving the lower ram to a filling position;

filling the die-bore with a volume of metallic powder;

vibrating the lower ram while filling the die-bore with the volume of metallic powder;

moving the lower ram to a proportioning position so that excess metallic powder extending above the die-plate may be removed;

removing excess metallic powder which extends above the die-plate, leaving a predetermined volume of metallic powder in the die-bore;

vibrating the lower ram while removing excess metallic powder; and compressing the metallic powder between the upper ram the lower ram.

* * * * *